May 19, 1970 — J. W. PAYNE — 3,512,687
COLLAPSIBLE TUBES
Filed June 29, 1966

INVENTOR
JOHN WILLIAM PAYNE
BY
Jacobs & Jacobs
ATTORNEY

United States Patent Office 3,512,687
Patented May 19, 1970

3,512,687
COLLAPSIBLE TUBES
John William Payne, West Mersea, Essex, England, assignor to Betts & Company Limited, London, England, a British company
Filed June 29, 1966, Ser. No. 561,424
Claims priority, application Great Britain, July 6, 1965, 28,512/65
Int. Cl. B67d 3/00
U.S. Cl. 222—542
2 Claims

ABSTRACT OF THE DISCLOSURE

Collapsible metal tubes for dispensing creams, toothpastes, etc. are constructed, wherein the metal nozzle has a plastic snap-on sleeve around it, and interengaging surfaces are provided between the nozzle and the sleeve shaped to provide two parellel circumferential line contacts which act as effective liquid-tight seals.

---

Figure 1:
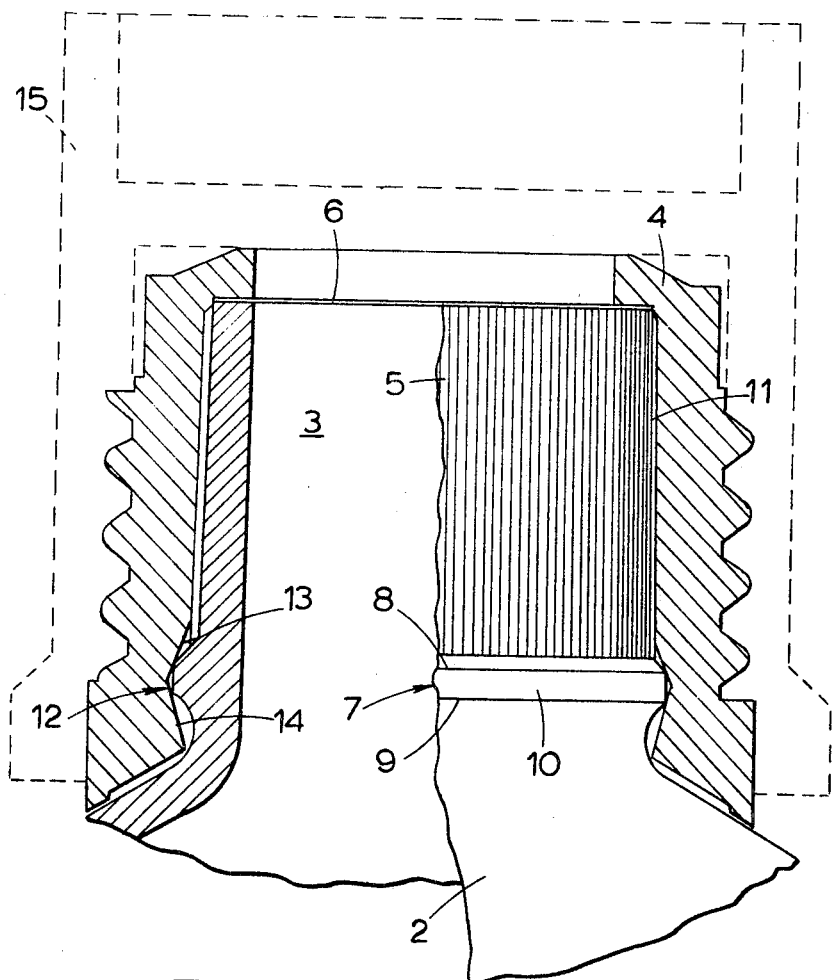

This invention is for improvements in and relating to collapsible tubes of the type used for example in packaging and dispensing toothpastes and in particular, to the type of metallic collapsible tube with an integrally formed metal nozzle having a resilient snap-on nozzle sleeve or outsert of a synthetic plastic material such as polyethylene. Specifically, this invention relates to a metallic collapsible tube of the kind in which the metal nozzle of the tube is sleeved with a resilient outsert of plastic material snapped into position over the outlet end of the nozzle and axially and non-rotatably retained in position on the nozzle by a suitable shaping of interengaging surfaces of the outsert and the nozzle (hereinafter referred to as a "collapsible tube of the kind specified").

In some applications of collapsible tubes of the kind specified, it is desirable to ensure that substantially no leakage path exists between the metallic nozzle and the plastic sleeve, for produce packed in the tube (or for a component of the produce e.g. a flavoring additive). To this end it has been proposed to shape the nozzle and sleeve so that complementary coaxial sealing surfaces are provided which are maintained in snug frictional contact when the sleeve is in position on the nozzle. Tubes in accordance with this known proposal achieve a blockage of any leakage path by virtue of snug contact between smooth areas of the nozzle and sleeve and in consequence place a high premium on the accurate maintenance of the tolerances on the dimensions of the contacting areas. In the mass production of collapsible tubes, the very close tolerances required to achieve leak sealing in accordance with this known proposal can create difficulties and the present invention relates to an alternative approach to the problem of creating a reliable seal between the metallic nozzle and the overlying plastic sleeve.

According to the present invention, the interengaging surfaces of the plastic sleeve and metal nozzle in a collapsible tube of the kind specified are shaped to define two spaced-apart circumferential regions of substantially line contact between the interengaging surfaces, the confronting surfaces of the sleeve and nozzle between the regions of line contact being maintained in spaced relation.

In a convenient form of the invention, the two regions of substantially line contact are provided by means of a flange on one of the interengaging surfaces having two spaced apart circumferential edges which contact the smooth surface of a circumferential groove in the other interengaging surface.

Preferably, the regions of substantially line contact are formed by providing spaced-apart circumferential edges on a flange of the nozzle which bite into the smooth surface of a circumferential groove in the sleeve. Alternatively, the sleeve may be provided with an inwardly extending flange which is shaped to define two spaced-apart circumferential edges which are compressed against the smooth surface of a circumferential groove in the nozzle. In a particularly preferred form, the circumferential groove has a shallow V-shaped cross section and one of the circumferential edges on the interengaging flange contacts one face of the groove surface and the other spaced-apart edge contacts the other face of the groove surface.

By providing line contact over two spaced-apart circumferential regions, highly effective leak sealing can be obtained between the sleeve and the nozzle. By employing "line" seals rather than "area" seals, it is possible to generate a far greater force urging the sealing regions into contact and in consequence to obtain an improved seal.

Figure 2:
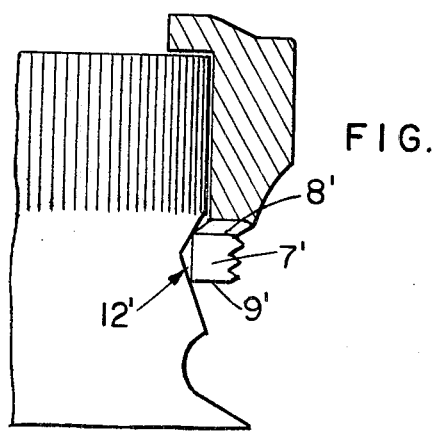

One form of collapsible tube in accordance with the invention is illustrated in the accompanying drawing in which FIG. 1 is a partially sectioned view of the nozzle end of a tube of the kind specified and FIG. 2 is a fragmentary view of a modification.

The tube illustrated in FIG. 1 comprises a deformable body portion (not shown), an integral shoulder 2, a nozzle 3, and a resilient plastic sleeve 4. The nozzle 3 is provided with a plurality of axial splines 5 adjacent to the open end 6 and a flange 7 intermediate the shoulder 2 and the splines 5. The flange 7 is formed with two circumferential edges 8 and 9 defining the edges of a plane cylindrical band 10.

The sleeve 4 is formed with a multi-grooved portion 11 to interengage with the splines 5 and thereby prevent relative rotation between the sleeve 4 and the nozzle 3. The sleeve is also formed with a shallow circumferential V-shaped groove 12 formed by the groove surface having smooth faces 13 and 14. When the sleeve is correctly located on the nozzle 3, the flange 7 is located within the groove 12, with edge 8 biting into groove surface face 13 and edge 9 biting into groove surface face 14 and with a clearance between band 10 and the meeting line of faces 13 and 14.

Apart from the extent to which the edges 8 and 9 bite into the groove surface faces 13 and 14, it will be appreciated that two spaced-apart circumferential line contacts are formed between the confronting surfaces of the sleeve 4 and the nozzle 3 which serve to lock the sleeve around the nozzle and also to seal any leakage path which might otherwise exist between them.

The tube is completed with a closure cap (shown dotted at 15) of a rigid plastic material, which tends to compress the sleeve against the nozzle and thus increase the pressure in the vicinity of the edges 8 and 9.

The proportional sizes and angles of the various surfaces employed in the specific embodiment being described are substantially as shown in the drawing and in practice we find that tolerances of 0.005 inch in the dimensions of the flange 7 and groove 12 can be accepted without impairing the effectiveness of the line seals obtained. It will be appreciated that small variations in the dimensions of the seal merely affect the extent to which the metal cuts into the sleeve and/or the actual location of the line seals on the surface faces 13 and 14.

It is preferred to form the edges 8 and 9 as the boundary between two extruded surfaces (rather than between two machined surfaces or between one extruded surface and one machined surface) since it is easier to get well defined edges in this way.

The illustrated embodiment is just one example of a tube in accordance with the invention and modifications of design may be employed within the scope of the invention as hereinbefore defined. Thus, for example, as shown in FIG. 2 in place of a V-shaped groove in the sleeve and a truncated flange on the nozzle, a shallow groove 12' may be formed in the nozzle and a cooperating truncated flange 7' formed on the inner surface of the sleeve. With this modification, the sleeve is flattened in the vicinity of the flange edges 8' and 9' to form the spaced-apart circumferential seals.

I claim:

1. A leak-resistant collapsible tube which comprises a collapsible body portion having an integral shoulder terminating in a nozzle, said nozzle having a flange near the shoulder portion which flange has two spaced apart circumferential edges and axial splines extending from said flange to the end of said nozzle, and a resilient snap-on sleeve to fit over said nozzle having on its inner surface grooves to mate with the axial splines on said nozzle and having a smooth surfaced circumferential groove so that one of the circumferential edges on the flange contacts one face of the groove surface and the other spaced apart edge contacts the other face of the groove surface, whereby two spaced apart regions of substantially line contact are provided when said sleeve is on said nozzle.

2. A tube according to claim 1 wherein the circumferential groove has a shallow V-shaped cross section.

References Cited

UNITED STATES PATENTS

| | | | |
|---|---|---|---|
| 2,576,416 | 11/1951 | Randlett | 222—542 |
| 2,848,145 | 8/1958 | Livingstone | 222—542 |
| 3,073,485 | 1/1963 | Schultz | 222—92 |
| 3,124,273 | 3/1964 | Remington et al. | 222—92 |
| 3,297,213 | 1/1967 | Henderson | 222—542 |

ROBERT B. REEVES, Primary Examiner